W. V. TURNER.
FLUID PRESSURE BRAKE.
APPLICATION FILED OCT. 10, 1906.
994,220.
Patented June 6, 1911.
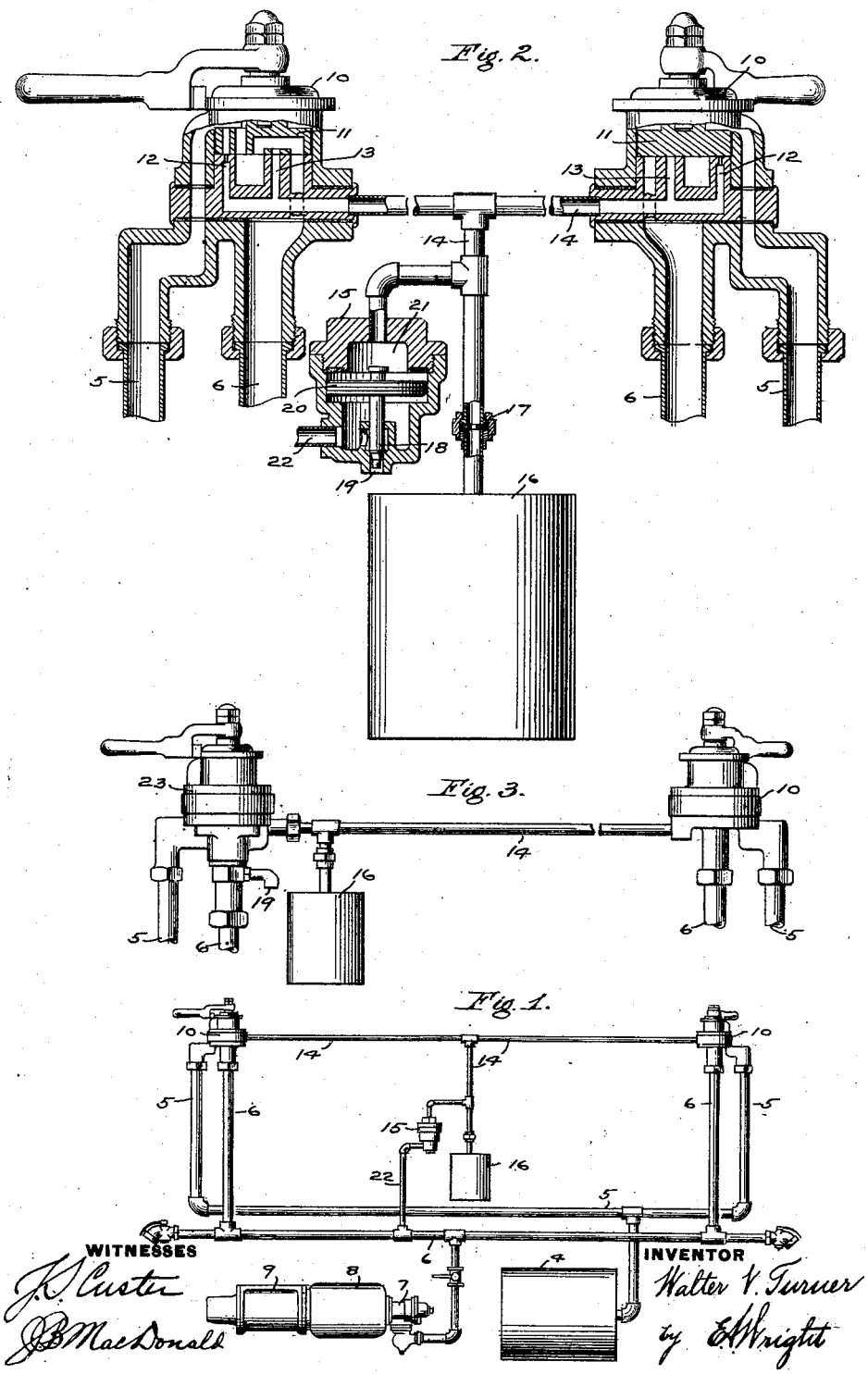

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

994,220.  Specification of Letters Patent.  Patented June 6, 1911.

Application filed October 10, 1906. Serial No. 338,248.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to automatic fluid pressure brake systems, and more particularly to that part of the equipment adapted to be used on double ended vehicles, such as electric locomotives or motor cars which are designed to run in either direction. It is customary in this class of service to provide two brake valves, one at each end of the locomotive or motor car, the motorman or engineman operating the brake system by means of the brake valve at the forward end, while the other brake valve is left in lap position or is cut off from the system by means of one or more cut-out cocks.

As is well known, the standard engineer's brake valve of the Westinghouse type includes an equalizing discharge valve and piston subject to the opposing pressures of the train brake pipe and the equalizing reservoir for effecting a gradual closing of the train pipe discharge port in making a service reduction for applying the brakes, the operation and advantage of which is thoroughly understood by all familiar with this art.

The main object of my present invention is to provide means whereby a single equalizing piston and discharge valve may be made to serve for both brake valves in a double ended equipment, and thereby simplify the apparatus and effect considerable economy in the number of parts necessary to be employed.

In the accompanying drawing: Figure 1 is a diagrammatic elevation showing a double ended brake equipment for locomotives or motor cars, and embodying one form of my improvement; Fig. 2 a view upon a larger scale, the brake valves and the equalizing discharge valve being shown in vertical section; and Fig. 3 a diagrammatic elevation illustrating a slight modification.

As shown in Figs. 1 and 2, the equipment comprises the usual main reservoir 4, main reservoir pipe 5, train brake pipe 6, triple valve 7, auxiliary reservoir 8 and brake cylinder 9. According to this form of my improvement the brake valves 10, one at each end of the vehicle, are provided with the usual train pipe and main reservoir pipe connections and the rotary valve 11 and its valve seat may be furnished with the same ports and correspond substantially with the rotary valve and seat of the well known standard Westinghouse engineer's brake valve, with the exception that the preliminary discharge port 12 and the equalizing port 13 of both brake valves, instead of communicating with the usual chamber above the equalizing piston in the body of the brake valve, are connected by a pipe 14 with the single equalizing discharge valve device 15 and the equalizing reservoir 16, which device may be located in any desired position, either in or beneath the vehicle, as may be most convenient. A restricted opening or choke 17 is provided for the inlet to the equalizing reservoir and the valve device comprises the valve 18 controlling the train pipe discharge port 19, and operated by equalizing piston 20 subject on its upper side to the pressure in chamber 21 communicating with the equalizing reservoir and on its lower side to the train pipe pressure through pipe connection 22.

As shown in Fig. 2 of the drawing, one of the brake valves 10 is indicated in lap position with all ports closed, while the other brake valve is shown in full release position and is supposed for the time being to be the valve at the forward end which is being operated to control the brakes.

The operation of my improved apparatus will now be readily understood. When this brake valve is turned to service application position for applying the brakes the preliminary discharge port 12 is opened through the usual cavity in the rotary valve to the atmosphere; this effects the desired reduction in pressure in the equalizing reservoir and chamber 21 through pipe 14, whereupon the equalizing piston rises under the superior train pipe pressure beneath and opens the train pipe discharge port in the usual way, producing the desired train pipe reduction and the gradual closing of the train pipe discharge port in the well known manner. When the brake valve is turned to full release position for releasing brakes communication is opened from the main reservoir supply through a large port to the train pipe for increasing the pressure therein in the usual way, and fluid under pressure from the main reservoir is also supplied through the preliminary discharge port 12 and pipe 4 to the equalizing reservoir 16 and chamber 21. In order that the pressure may not increase in the train pipe and beneath the equalizing piston 20 faster than it does in chamber 21 above the piston a choke 17 is placed at the entrance to the equalizing reservoir 16, which choke prevents the free flow of fluid to the reservoir and causes an accumulation of a higher pressure in chamber 21. By this means all danger of raising the equalizing piston and opening the train pipe discharge port when the brake valve is turned to full release position is obviated. It will now be apparent that the equalizing discharge valve device will operate in the same manner as above described when the brakes are controlled by the movement of the other brake valve and the first brake valve is in its turn placed on lap position, so that the single equalizing discharge valve device serves for both brake valves of the double ended equipment, thereby simplifying the apparatus and lessening the cost of equipment.

While the design illustrated in Figs. 1 and 2 has the advantages that the two brake valves are alike and occupy but little space, and that the train pipe discharge valve may be located in any convenient position where the train pipe discharge is not objectionable, it will be evident that the equalizing discharge valve device may be located near one of the brake valves, if desired, or, as illustrated in Fig. 3, one of the brake valves may be of the type shown in Fig. 2, while the other brake valve 23 may be a standard Westinghouse engineer's brake valve having the usual equalizing piston and discharge valve contained in the body of the casing and controlling the discharge port 19 in the customary manner, the pipe 14 communicating with the equalizing reservoir connection. It will be obvious that in this case the single equalizing piston and discharge valve of the engineer's brake valve 23 will also serve for the brake valve 10 when the brakes are manipulated from that end of the vehicle, and that the operation will be substantially the same as before described. If desired, three or more brake valves could be connected to a single equalizing discharge valve device in a similar manner.

Having now described my invention, what I claim as new and desire to secure by Letters Patent, is:—

1. In a fluid pressure brake, the combination with a plurality of brake valves, of a single equalizing discharge valve device for the train pipe adapted to be operated by either brake valve.

2. In a fluid pressure brake, the combination with a train pipe discharge valve and a piston for operating said valve, of a plurality of brake valves, and means operated by either brake valve for controlling the pressure on said piston.

3. In a fluid pressure brake, the combination with a train pipe discharge valve and piston for operating the same, of two brake valves, each having ports and connections for controlling the pressure on one side of said piston.

4. In a fluid pressure brake, the combination with a train pipe discharge valve, and a piston subject to the opposing pressure of the train pipe and an equalizing chamber for operating said valve, of two brake valves, each having ports and connections for controlling the pressure in the equalizing chamber.

5. In a fluid pressure brake, the combination with a train pipe discharge valve and piston for operating the same, of an equalizing reservoir having a restricted inlet passage, and two brake valves each having means for supplying fluid under pressure to the equalizing reservoir and to one side of said piston.

6. In a fluid pressure brake, the combination with a train pipe discharge valve and a piston subject to the opposing pressures of the train pipe and an equalizing chamber for operating said valve, of an equalizing reservoir having a restricted inlet passage, and two brake valves, each having ports adapted to supply fluid under pressure to the train pipe and also to the equalizing chamber and the equalizing reservoir.

7. In a fluid pressure brake, the combination with a train pipe discharge valve, and a piston subject to fluid pressure for effecting a gradual closing of said valve, of a plurality of brake valves, each having ports and connections for varying the fluid pressure acting on said piston.

8. In a fluid pressure brake, the combination with two brake valves, of an equalizing discharge valve device, an equalizing reservoir therefor, and means operated by either brake valve for varying the pressure in said equalizing reservoir.

9. In a fluid pressure brake, the combination with an equalizing reservoir, of one valve mechanism only, subject to the pressure in said equalizing reservoir for controlling the discharge of air from the train pipe, and a plurality of brake valves for controlling the pressure in said reservoir.

In testimony whereof I have hereunto set my hand.

WALTER V. TURNER.

Witnesses:
R. F. EMERY,
J. B. MACDONALD.

Copies of this patent may be obtained for five cents each, by addressing the "Commissioner of Patents, Washington, D. C."